United States Patent [19]
Phillips

[11] Patent Number: 4,717,263
[45] Date of Patent: Jan. 5, 1988

[54] GAS BEARING

[75] Inventor: Edward H. Phillips, Middletown, Calif.

[73] Assignee: Compact Spindle Bearing Corporation, Middletown, Calif.

[21] Appl. No.: 938,859

[22] Filed: Dec. 8, 1986

Related U.S. Application Data

[63] Continuation of Ser. No. 759,185, Jul. 26, 1985, abandoned.

[51] Int. Cl.⁴ .................................................. F16C 32/06
[52] U.S. Cl. ........................................ 384/12; 384/123
[58] Field of Search ................ 384/12, 123, 121, 109, 384/111, 112, 113, 450

[56] References Cited

U.S. PATENT DOCUMENTS

| | | |
|---|---|---|
| 2,710,234 | 6/1955 | Hansen . |
| 3,322,473 | 5/1967 | Lebach . |
| 3,722,996 | 3/1973 | Fox . |
| 3,801,165 | 4/1974 | Lombard . |
| 4,099,802 | 7/1978 | Heinemann et al. . |
| 4,232,913 | 11/1980 | Nilsson . |
| 4,307,918 | 12/1981 | Mohsin . |
| 4,558,909 | 12/1985 | Stauber . |

FOREIGN PATENT DOCUMENTS

| | | |
|---|---|---|
| 2645050 | 4/1977 | Fed. Rep. of Germany . |
| 1009069 | 5/1952 | France . |
| 2130997 | 11/1972 | France . |
| 2340470 | 2/1977 | France . |
| 2476773 | 8/1981 | France . |
| 983310 | 2/1965 | United Kingdom . |
| 2070156 | 9/1981 | United Kingdom . |

Primary Examiner—Lenard A. Footland
Attorney, Agent, or Firm—Roland I. Griffin

[57] ABSTRACT

Statically pressurized gas bearings employ improved bearing pockets, each including one or more slots arranged in a double cross, star or other configuration, and supplemental gas exhaust slots, as well as stepped annular land flow restrictors, to optimize bearing stability and operational bandwidth.

14 Claims, 13 Drawing Figures

GAS BEARING

CROSS-REFERENCE TO RELATED APPLICATION

This is a continuation of U.S. patent application Ser. No. 759,185, filed July 26, 1985, now abandoned.

BACKGROUND AND SUMMARY OF THE INVENTION

This invention relates generally to configurations used for forming statically pressurized gas bearings commonly utilized to facilitate precision translational and rotational motion in gas bearing slide and spindle assemblies, respectively. It is specifically directed toward solving the major design problem of applying statically pressurized gas bearings, that of achieving bearing stability in the direction orthogonal to the supported bearing surface.

Statically pressurized gas bearings are compensated by restricting the gas flow into each bearing. This can be accomplished with a flow restrictor located in, or a flow restrictor associated with, the gas inlet to the bearing so that the pressure of the gas in the bearing is reduced below the supply pressure. Gas pressure in the bearing is controlled by restricting flow out of the bearing, as determined by the bearing configuration and the inverse of the third power of the flying height of the bearing. Concomitantly, the gas pressure in the bearing is equal to the load supported by the bearing divided by the effective bearing area. Thus, the load supported by the bearing and the flying height of the bearing are related and mutually controlled in the manner of a closed loop servo system. The forward gain of this servo system is the ratio of the value of a small change in the supported load divided by the value of the related small change in the flying height and is commonly referred to as the spring stiffness of the bearing.

One of the methods commonly used to provide increased spring stiffness of the bearing is to increase the load supported by the bearing by incorporating a vacuum hold-down pocket within the overall bearing configuration. See U.S. Pat. No. 3,722,996 entitled OPTICAL PATTERN GENERATOR OR REPEATING PROJECTOR OR THE LIKE and issued Mar. 27, 1973, to Wayne L. Fox for an example of such a gas bearing. Such a design modification can have an effect on bearing stability as well. This effect can either be positive or negative depending on the other design characteristics of the gas bearing.

In a gas bearing, the spring stiffness of the bearing does not have a constant value with respect to a disturbing frequency. This is because of the compressibility of the gas in the bearing itself. The energy storage associated with this compressed gas, coupled with the gas flow resistances of the bearing, causes the spring stiffness of the bearing to vary in a complex manner, including both amplitude and phase variations. One component of the frequency-varying spring stiffness is out of phase with the characteristic damping coefficient of the bearing and effectively reduces bearing damping. Thus, it is quite possible for the algebraic sum of the characteristic damping coefficient and the out-of-phase component of the spring stiffness to become negative in character and cause the bearing to self oscillate.

Concomitantly, the frequency bandwidth of the amplitude of the spring stiffness of the bearing is limited by the amplitude variation referred to above. The volume of compressed gas in the bearing has the characteristics of a pneumatic capacitance. This capacitance coupled with the gas flow resistances of the bearing determines a time constant. The spring stiffness of the bearing rolls off in a square law fashion beyond the corner frequency determined by the time constant and the bearing is functionally inoperable beyond this corner frequency.

Gas bearing design is complicated by the fact that the corner-frequency-determining time constant and the algebraic sum of the desirable characteristic damping coefficient of the bearing and the undesirable out-of-phase component of the spring stiffness are both linearly related to the inverse of the third power of the flying height of the bearing. Thus, the simple "cut and try" methods often used in gas bearing design are inappropriate. What is needed is a more complete understanding of the myriad of factors that control gas bearing performance and a gas bearing design that optimizes these factors. This design should include an incoming flow restrictor and a pocket configuration ensuring optimal incoming and outgoing gas flow characteristics, respectively.

Accordingly, it is a principal object of this invention to provide a statically pressurized gas bearing having improved bearing stability characteristics.

Another object of this invention is to provide a statically pressurized gas bearing having increased operational frequency bandwidth.

Another object of this invention is to provide an improved incoming flow restrictor for a statically pressurized gas bearing.

Another object of this invention is to provide an improved bearing pocket configuration for a statically pressurized gas bearing.

Still another bearing of this invention is to provide an improved bearing pocket configuration for a statically pressurized gas bearing having a vacuum hold-down pocket feature.

These and other objects, which will become apparent from an inspection of the accompanying drawings and a reading of the associated description, are accomplished according to an illustrated preferred embodiment of the present invention by providing a statically pressurized gas bearing with a gas pocket shaped like a double cross formed as fine slots in the bearing surface with a minimum of resulting gas volume. Exhaust slots, centered between the arms of the double cross, are also formed in the bearing surface to minimize the outgoing flow resistance. Gas is supplied to the gas pocket from a source of pressurized gas through a hole and over an annular land of selected height, both of which are formed in the center of the double cross.

The aforementioned objects are also accomplished according to another illustrated preferred embodiment of the present invention by providing a statically pressurized gas bearing incorporating a vacuum hold-down pocket with multiple gas pockets formed as fine slots in the bearing surface with a minimum of resulting gas volume. The vacuum hold-down pocket is formed in the bearing surface and centered within the bearing surface area bounded by the slots forming the multiple gas pockets. Gas is supplied to each of the gas pockets from a source of pressurized gas though a hole, over an annular land and through an annular groove (disposed tangent to the slot forming the gas pocket), all of which are formed in the bearing surface opposite the vacuum hold-down pocket.

DESCRIPTION OF THE PREFERRED EMBODIMENTS

Figure 1:
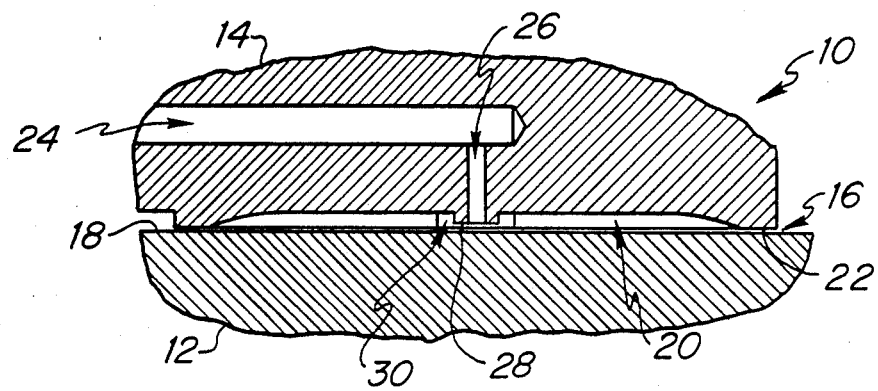
FIG. 1 is a sectional view of a statically pressurized gas bearing in accordance with a preferred embodiment of the present invention.

Referring now to FIG. 1 there are shown fundamental elements of a statically pressurized gas bearing 10 in accordance with a preferred embodiment of the present invention. A pair of objects 12 and 14 are separated by an operating clearance or flying height 16. Object 12 has a plane bearing surface 18 while object 14 has a bearing pocket 20 surrounded by a land surface 22. Pressurized gas of an absolute pressure $P_s$ is introduced, in a restricted manner, from a distribution passage 24 through a hole 26, over an annular land 28 and through an annular groove 30 to the pocket 20. Object 14 of a mass M is supported with a force $F_1$. The bearing pocket 20 has an effective pocket area $A_1$ (including a portion of the surrounding land area). Load $F_1$ comprises the product of the effective pocket area $A_1$ and the difference of the absolute pocket pressure $P_1$ and 15 lbs./in.$^2$ (atmospheric pressure), or $A_1(P_1-15)$. Pressure $P_s$, of course, must be greater than $P_1$ since a pressure drop $P_s-P_1$ is effected as the incoming gas flows across the pneumatic resistance $R_1$ formed by annular land 28.

Figure 2:
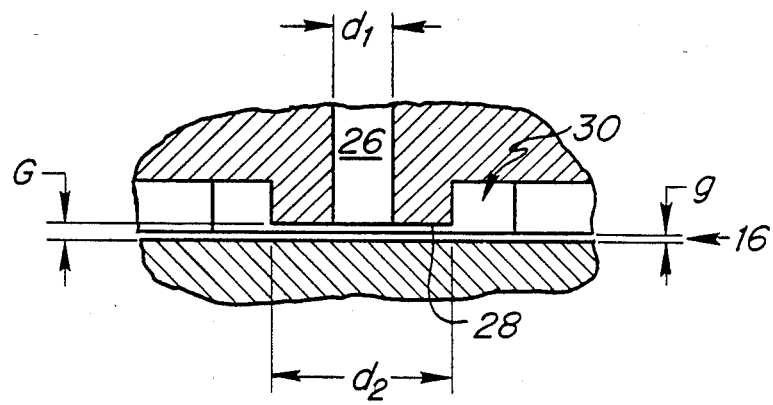
FIG. 2 is an enlarged sectional view of the inlet flow restrictor of the statically pressurized gas bearing of FIG. 1.

The gas flow over the annular lead 28 may be considered in greater detail by referring to FIG. 2, which is an enlarged view of the gas inlet region of the statically pressurized gas bearing 10 of FIG. 1. Flying height 16 has the value g while the gap under annular land 28 has the value G. Thus, when the bearing is fabricated, annular land 28 is inwardly offset from the land surface 22 by a value of $G-g$. The dimensions of the annular land 28 also include an inside diameter $d_1$ and an outside diameter $d_2$.

The pneumatic resistance $R_1$ is determined by $$R_1 = (12\mu/G^3)(1/N_1'),$$

where $\mu$ is the coefficient of viscosity of the gas and $N_1'$ is defined as a calculated equivalent number of squares arranged orthogonally with respect to the direction of incoming gas flow across annular land 28, as would be seen by an observer located within the bearing pocket 20. Since the gas is compressible, $N_1'$ is not equal to $N_1$, the geometrically determined number of squares arranged orthogonally with respect to the direction of gas flow across annular land 28. The value of $N_1$ is determined by $$N_1 = 2\pi/\ln(d_2/d_1)$$

and $N_1'$ may be vaued by the formula $$N_1' = N_1(P_1+P_s)/2P_1.$$

Similarly, the pneumatic resistance $R_2$ of the outgoing gas flow over the land surface 22 is determined by $$R_2 = (12\mu/g^3)(1/N_2'),$$

where $N_2'$ is defined as a calculated equivalent number of squares arranged orthogonally with respect to the direction of outgoing gas flow across land surface 22, as would be seen by an observer located within the bearing pocket 20. Also, $N_2'$ is not equal to $N_2$, the geometrically determined number of squares arranged orthogonally with respect to the direction of gas flow across land 22. The value of $N_2$ must be determined by solving the Laplacian equation $\nabla^2 = 0$ with respect to the geometry of land 22. $N_2'$ may be determined by the formula $$N_2' = N_2(P_1+15)/2P_1.$$

If $g = g_o + \gamma \cos \omega t$ and $G = G_o$ when $\gamma = 0$ and $a = -G_o/g_o$, then $$G = ag_o + \gamma \cos \omega t,$$

$$R_1 = 24\mu P_1/N_1(P_1+P_s)(ag_o+\gamma \cos \omega t)^3 \text{ and}$$

$$R_2 = 24\mu P_1/N_2(P_1+15)(g_o+\gamma \cos \omega t)^3.$$

If $R_1 = R_{01}$, $R_2 = R_{02}$ and $P_1 = P_{01}$ when $\gamma = 0$, and if $b = R_{01}/R_{02}$, $c = (P_{01}+P_s)/P_{01}$, $d = (P_{01}+15)/P_{01}$ and $P_1 = P_{01} + B \cos \omega t + C \sin \omega t$, then $$R_1 = bR_{02}/[1 + 3\gamma \cos \omega t/ag - B \cos \omega t/cP_{01} - C \sin \omega t/cP_{01}]$$

and PS
$$R_2 = R_{02}/[1 + 3\gamma \cos \omega t/g - B \cos \omega t/dP_{01} - C \sin \omega t/dP_{01}].$$

Figure 3:
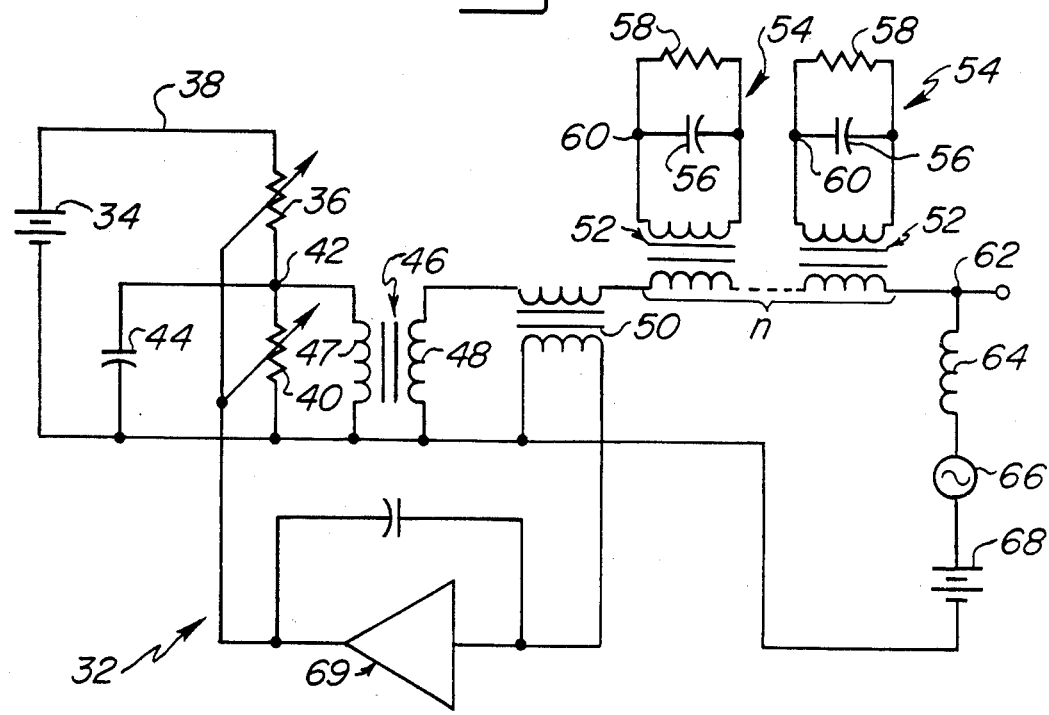
FIG. 3 is a schematic diagram of an equivalent electrical circuit for the statically pressurized gas bearing of FIG. 1.

FIG. 3 provides an equivalent electrical circuit 32 that can be used to model or describe the dynamic operation of a single gas bearing. It is particularly useful in describing the factors relating to bearing stability and operational frequency bandwidth.

With particular reference now to FIG. 3, a battery 34 represents the supply pressure $P_s$ of the gas supplied to the pneumatic resistance $R_1$ of the gas bearing 10 of FIG. 1. A variable resistor 36 represents the pneumatic resistance of $R_1$, and a voltage bus 38 represents the passage 24 and hole 26. Another variable resistor 40 represents the pneumatic resistance, $R_2$. Voltage at a node 42 represents the absolute pressure $P_1$. A capacitor 44 represents the pneumatic capacitance $C_1$ of the volume $V_1$ of compressed gas in bearing pocket 20 and, specifically, has the value $C_1 = V_1/P_1$. An ideal transformer 46, which operates at all frequencies down to D.C., has a primary winding connected to the node 42 and a secondary winding 48. The primary to secondary winding ratio of this transformer is equal to the reciprocal of the effective pocket area $A_1$. Another ideal transformer 50, which has zero open circuit inductance, senses any displacement velocity $dg/dt$. A number n of third ideal transformers 52 (each having a primary to secondary winding ratio $A_2$) corresponding to n unbroken areas of land surface 22 transform the physical displacement $g-g_o$ into squeeze film damping circuits 54. Each squeeze film damping circuit consists of a parallel connection of a capacitor 56, representative of the capacitance $C_2$ formed by the ratio of a volume $gA_2$ of gas divided by an average land pressure $P_2$, and a resistor 58, representative of the pneumatic resistance $R_3$ resisting gas flow to $C_2$ (at node 60). The voltage at a node 62 represents the mechanical force exerted by the gas bearing 10 on mass M, which is represented by an inductor 64. An A.C. displacement source 66 represents the alternating component $\gamma \cos \omega t$, and a battery 68 represents the D.C. component $g_o$ of the flying height 16. Feedback regulation of the flying height 16 of gas bearing 10 is represented by an integrating operational amplifier 69 serving to maintain the values of $R_1$ and $R_2$ as noted above.

If $e = (P_{01}-15)/P_{01}$, $f = cd/(be+c)$ and $h = [1+(15/P_{01})]/[1+(15/P_{01})^2]$, then $$Q_{R1} = -(P_{01}-15)/R_{02} - 3(P_{01}-15)\gamma \cos \omega t/aR_{02}g_o + B \cos \omega t/fR_{02} + C \sin \omega t/fR_{02},$$

$$Q_{R2} = (P_{01}-15)/R_{02} + 3(P_{01}-15)\gamma \cos \omega t/R_{02}g_o + B \cos \omega t/hR_{02} + C \sin \omega t/hR_{02},$$

$$Q_{C1} = -\omega C_{01} B \sin \omega t + \omega C_{01} C \cos \omega t \text{ and}$$

$$Q_{A1} = -\omega A_{01} \gamma \sin \omega t,$$

where $Q_{R1}$, $Q_{R2}$, $Q_{C1}$ and $Q_{A1}$ are volumetric flow rates away from node 42 through $R_1$, $R_2$, $C_1$ and $A_1$ (represented by 36, 40, 44 and 46, respectively), respectively and $C_1 = C_{01}$ when $\gamma = 0$. Summing these volumetric flow rates to zero yields $$B = -[3(a-1)j(P_{01}-15)/a + j^2\omega^2 mAC_{01}R_{02}^2 g_o]\gamma/[1+j^2\omega^2 C_{01}^2 R_{02}^2]g_o \text{ and}$$

$$C = [j\omega mAR_{02}g_o - 3(a-1)j^2\omega C_{01}R_{02}(P_{01}-15)/a]\gamma/[1+j^2\omega^2 C_{01}^2 R_{02}^2]g.$$

where $j = fh/(f+h)$, the total plan view area of the gas bearing 10 is A, m is approximately equal to $(2P_{01}+15)/(3P_{01}+45)$, as discussed below, and $A_1 = mA$ when $\gamma = 0$. As noted above, the forward gain of the servo loop is the spring constant k of the gas bearing 10 and it may be evaluated by $$k = -(B + C\tan\omega t)nA/\gamma \text{ or}$$

$$k = [3(a-1)jnA(P_{01}-15)/a + j^2\omega^2 mnA^2 C_{01}R_{02}^2 g_o]/[1+j^2\omega^2 C_{01}^2 R_{02}^2]g_o$$

$$-[j\omega mnA^2 R_{02}g_o - 3(a-1)j^2\omega nAC_{01}R_{02}(P_{01}-15)/a]\tan\omega t/[1+j^2\omega^2 C_{01}^2 R_{02}^2]g_o,$$

where n is a slight modification of m to account for $dA_1/dP_1$ and is approximately equal to $(2P_{01}^2+60P_{01}+225)/(3P_{01}^2+90P_{01}+225)$.

The significance of the term "tan t" is that the bracketed terms multiplied by it are $+$ or $-90°$ out of phase with the D.C. term in the first set of bracketed terms. The positive term represents the work output of the forward gain of the loop, is phase shifted 90° by one pole, and is a stabilizing term. The negative term represents the energy stored in the capacitor $C_1$ is phase shifted 270° C. by three poles, and is a destabilizing term. A primary conclusion of this derivation is that stability will be guaranteed if the positive term is larger than the negative term. Therefore, "a" should be determined by $$a/(a-1) > 3jC_{01}(P_{01}-15)/mAg_o$$

to guarantee bearing stability. Another important conclusion of this derivation is that maximum operational frequency bandwidth will be achieved through minimizing both $C_{01}$ and $R_{02}$.

The non D.C. term in the first bracketed set of terms represents the compressive spring-like energy present in the compressed gas contained within the volume $V_1$. The D.C. value $k_o$ of the spring constant k of the gas bearing 10 may be determined by $$k_o = 3(a-1)jnA(P_{01}-15)/ag_o.$$

Care should be exercised in evaluating m. This is because of its dependence on the geometry of the land surface 22. It may be determined by solving the Laplacian equation $\nabla^2 p^2 = 0$ for $A_1$ and then evaluating $m = A_1/A$.

The derivation of the stability criteria can be completed by including the effects of the squeeze film damping circuits to evaluate the damping coefficient of the gas bearing 10. If, when $\gamma = 0$, $P_2 = P_{02}$ and $R_3 = R_{03}$, and $P_2 - P_{02} = D \cos \omega t + E \sin \omega t$, then $$Q_{R3} = D \cos \omega t/R_{03} + E \sin \omega t/R_{03},$$

$$Q_{C2} = -\omega A_2 g_o D \sin \omega t/P_{02} + \omega A_2 g_o E \cos \omega t/P_{02} \text{ and}$$

$$Q_{A2} = -\omega A_2 \gamma \sin \omega t,$$

where $Q_{R3}$, $Q_{C2}$ and $Q_{A2}$ are volumetric flow rates away from node 60 through $R_3$, $C_2$ and $A_2$ (represented by 58, 56 and 52, respectively), respectively. Summing these volumetric flow rates to zero yields $$D = -(\omega^2 A_2^2 R_{03}^2 g_o/P_{02})\gamma/(1+\omega^2 A_2^2 R_{03}^2 g_o^2/P_{02}^2) \text{ and}$$

$$E = (\omega A_2 R_{03})\gamma/(1+\omega^2 A_2^2 R_{03}^2 g_o^2/P_{02}^2).$$

The damping coefficient $\sigma$ may be determined by $$\sigma = n(D \cot \omega t + E)A_2/\omega\gamma \text{ or}$$

$$\sigma = -n(\omega A_2{}^3 R_{03}{}^2 g_o/P_{02}) \cot \omega t/(1+\omega^2 A_2{}^2 R_{03}{}^2 g_o{}^2/P_{02}{}^2) + n(A_2{}^2 R_{03})/(1+\omega^2 A_2{}^2 R_{03}{}^2 g_o{}^2/P_{02}{}^2).$$

The significance of the term "cot $\omega t$" is the term D multiplied by it is 90° out of phase with the nominal damping coefficient, which is represented by the second term E. The first term, then, represents the compressive spring-like energy in the gas contained within the volume $gA_2$, is phase shifted by one zero with respect to the nominal damping coefficient, and is therefore in phase with the D.C. component of the spring constant k. It may be noted that the low frequency value for the damping coefficient reduces to $$\sigma_o = n(A_2{}^2 R_{03}),$$

which can be recognized as n times the area transformed value of the pneumatic resistance $R_{03}$.

The performance of gas bearing 10 may be plotted with respect to a disturbing frequency by evaluating $$F \cos(\omega t + \phi)/\gamma = -M\omega^2 \cos \omega t - \sigma\omega \sin \omega t + k \cos \omega t,$$

where $\phi$ is the phase angle between the A.C. component $\gamma \cos \omega t$ of the flying height 16 and the resultant force $F \cos(\omega t + \phi)$.

Figure 4:
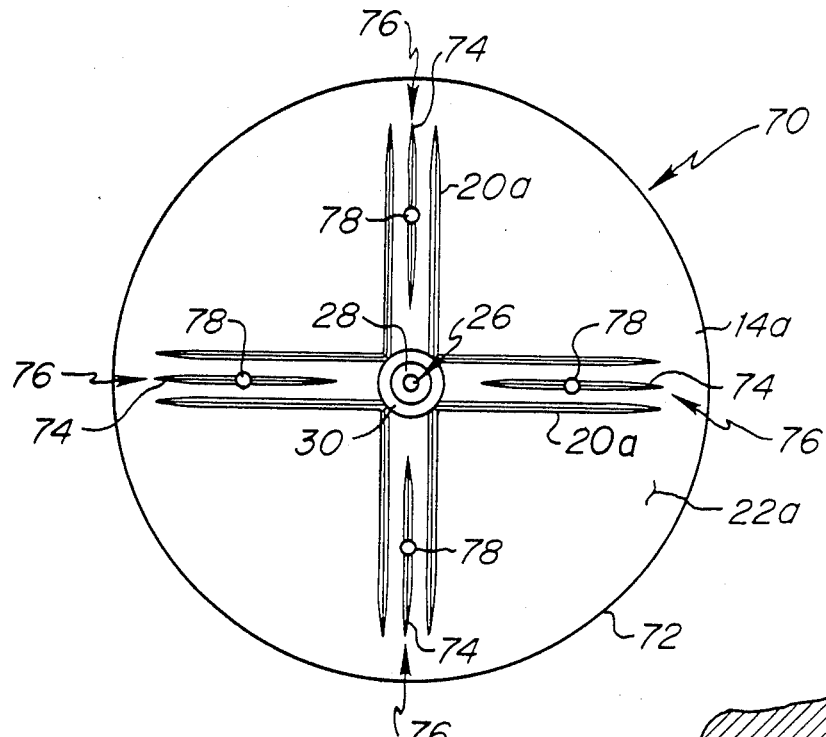
FIG. 4 is a plan view of a statically pressurized gas bearing such as that of FIG. 1.

FIG. 4 shows a plan view of a gas bearing 70 having a bearing pocket 20a shaped like a double cross in accordance with another preferred embodiment of the present invention. The double cross bearing pocket 20a is formed in the land surface 22a of an object 14a, and the spacing between crosses is chosen such that the outside diameter of annular land 28 is tangent with the inside of the double cross bearing pocket as shown. Gas flows from the hole 26, over annular land 28 and into annular groove 30 as described above. The gas then flows from the annular groove into the double cross bearing pocket 20a. The primary function of the double cross configuration of the bearing pocket 20a is to define the inner boundary of the land surface 22a in a manner similar to a pocket configuration called the "magic X", which is known to be stable and has been sold commercially by Philsen Products Inc. of Santa Clara, Calif. This pocket configuration is of the "open" type, meaning that the gas flow across the land surface 22a is predominantly dispersive in nature and outward by the outer boundary 72 of the gas bearing 70. The effective pocket area for such an "open" pocket configuration is stable in character, growing from mA=0.5A for $P_{01}$=15 lbs./in.$^2$ to mA=(2+15/$P_{01}$)A/(3+45/$P_{01}$) as described above. While such an "open" pocket configuration is stable, it can be overly restrictive of outgoing gas flow with the result that $R_{02}$ can be large enough to materially degrade the operational frequency bandwidth for a gas bearing pocket design such as the "magic X". The double cross bearing pocket configuration permits a solution of this problem by allowing supplemental gas exhaust slots 74 to be positioned in the land surface 22 and within double cross regions 76. Thus, outgoing gas flow can easily be increased by an order of magnitude (as a result of the attendant reduction in $R_{02}$) without increasing the flying height 16 or losing the basic stability advantages of the "open" pocket configuration. The additional outgoing gas is then exhausted through exhaust holes 78 to the ambient 15 lbs./in.$^2$ via passageways not shown.

Figure 5:
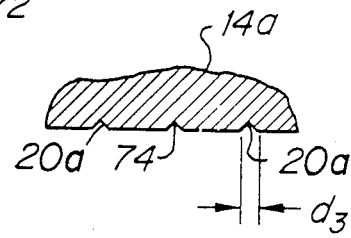
FIG. 5 is an enlarged sectional view of slots forming the gas pocket and of the exhaust slot of the statically pressurized gas bearing of FIG. 4.

Also, as noted above, it is necessary to minimize $C_{01}$. Thus, the slots that comprise the bearing pocket 20a must be made as small as possible without overly restricting gas flow through the bearing pocket. Additionally, it is desirable for the slots that comprise the bearing pocket 20a to have beveled edges to minimize burrs and other manufacturing anomalies. FIG. 5 shows a cross section of slots comprising both the double cross bearing pocket 20a and the gas exhaust slot 74 formed in this manner. A dimension $d_3$ of 0.010 in. across the opening of the slots is representative of a typical gas bearing 70 of the present invention. One method of fabrication is to cut the slots with a double angle milling cutter, letting the end of the slots "tail out" as shown in FIG. 4.

Figure 6:
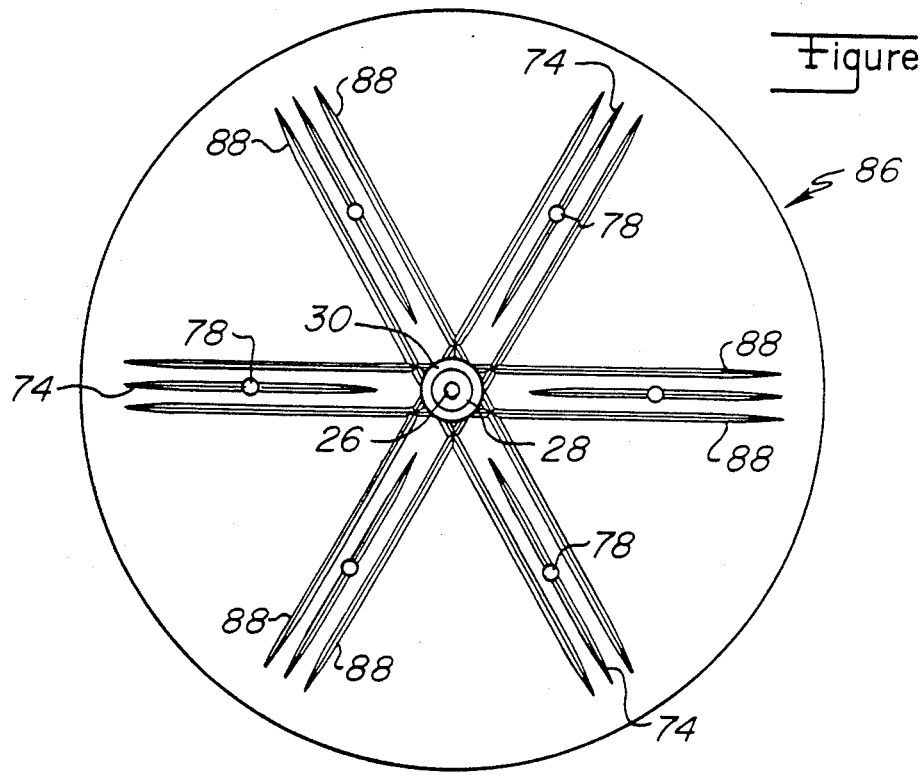
FIG. 6 is a plan view of a statically pressurized gas bearing, in accordance with another embodiment of the present invention, having a pocket configuration with an increased number of arms.

FIG. 6 shows a gas bearing 86 similar to that of FIGS. 4 and 5 but having a bearing pocket comprising a double star 88 of six arms in accordance with another preferred embodiment of the present invention. In general, a star with any number of arms (including one arm) is within the scope of the invention. However, stars with an even number of arms are preferred for ease of manufacture. Also, it should be noted that stars with a high number of arms may lose the advantages of an "open" pocket configuration.

Figure 7:
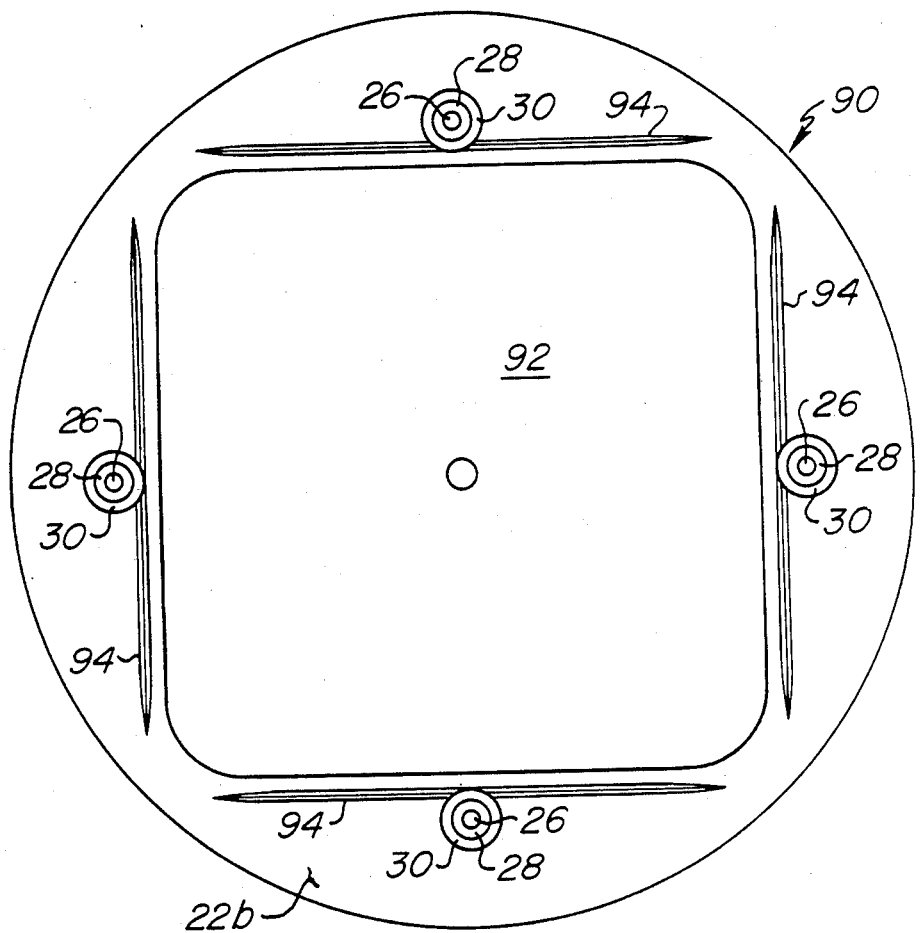
FIG. 7 is a plan view of a statically pressurized gas bearing, in accordance with another embodiment of the present invention, having a vacuum hold-down pocket.

FIG. 7 shows a gas bearing 90 having a vacuum hold-down pocket 92 and four generally cordal slots forming four individual bearing pockets 94. The four bearing pockets 94 require only one slot (two arms) each and no supplemental gas exhaust slots because of their proximity to the vaccum hold-down pocket 92 along their entire length. This ensures a low value of $R_{02}$. A hole 26, annular land 28 and annular groove 30 are formed on the outer side of each bearing pocket 94 with the annular groove 30 tangent to the center of the slot forming the bearing pocket as shown. The vacuum hold-down pocket 92 is shown as being released (across the entire extent thereof) below the plane of the land surface 22b for each of fabrication (it is much easier to microfinish a peripheral portion of a surface than a complete surface). The loss of the area of the vacuum hold-down pocket 92 as a contributor to the damping coefficient is not serious because of the coefficient's rapid fall off with pressure in such a vacuum area.

Figure 8A:
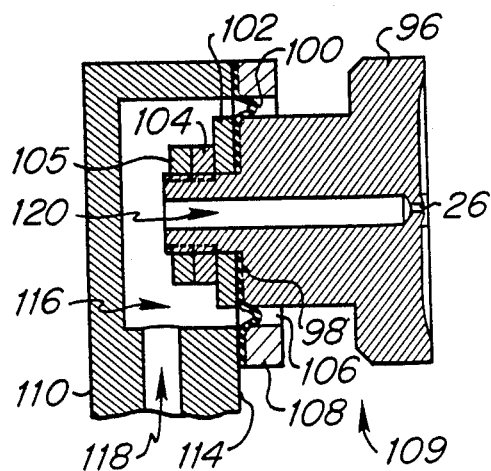
FIGS. 8A and 8B are a sectional view and a plan view, respectively, of a frictionless piston-loaded, statically presurized gas bearing in accordance with another preferred embodiment of the present invention.
Figure 8B:
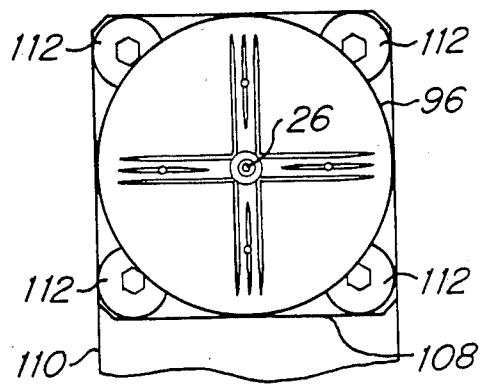

FIGS. 8A and 8B show an axially loaded gas bearing assembly 109. An axially-loaded, cylindrical gas bearing 96 is provided with an annular shoulder 98 adapted for use as a piston for a fabric reinforced rolling diagram seal 100, such as a class 4C diaphragm available from Bellofram Corporation of Burlington, Mass. The diapragm seal 100 is held in place on the shoulder 98 by a washer 102, a nut 104 and a lock nut 105. A hole 106 formed in a plate 108 serves as a cylinder for the diphragm seal 100. The foregoing gas bearing assembly 109 is mounted onto a cylinder block 110 by using bolts 112 to fasten the plate 108 and the diapragm seal 100 to a face 114 of the cylinder block. The gas bearing assembly 109 is thus positioned in a concentric manner around a cavity 116. In operation, pressurized gas flows through a passage 118 into the cavity 116, forces the gas bearing outward to provide the desired bearing load, flows through a passage 120, and finally flows through the hole 26 as described hereinbefore. Gas bearing 96 then bears against a slide (not shown) to provide loading for its mating, stem supported gas bearing (not shown). The flexible nature of the diapragm seal 100 coupled with the stable self positioning capability of the gas bearing 96 allows the gas bearing to conform to the actual alignment of the slide.

Figure 9:
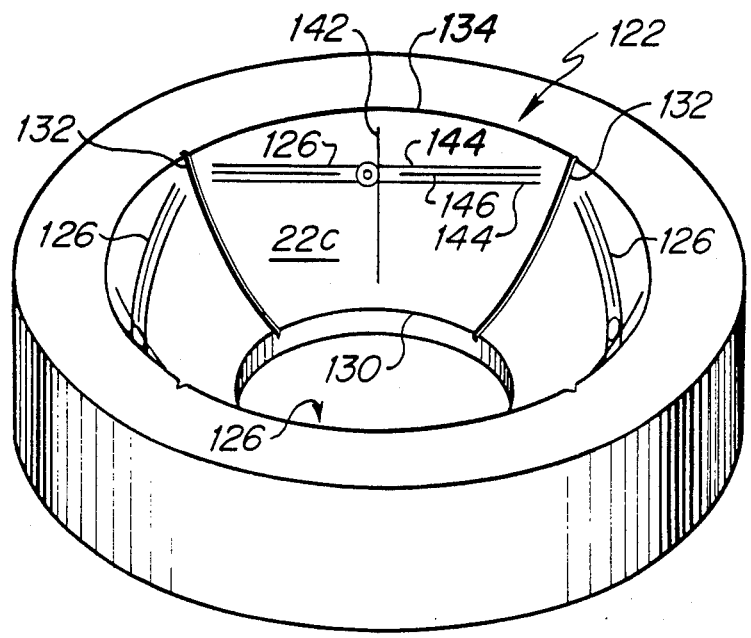
FIG. 9 is a perspective view of a concave bearing surface of a statically pressurized compact spindle bearing utilizing statically pressurized gas bearings in accordance with another preferred embodiment of the present invention.
Figure 10:
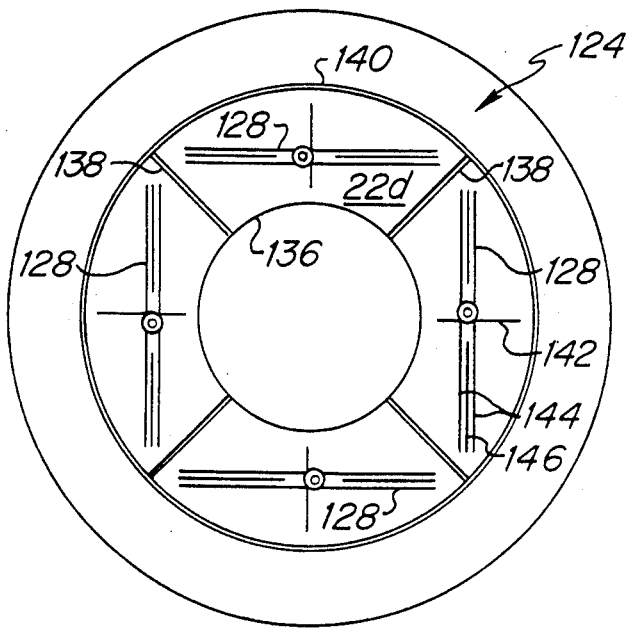
FIG. 10 is a plan view of a plano bearing surface of a statically pressurized compact spindle bearing utilizing statically pressurized gas bearings in accordance with another preferred embodiment of the present invention.

FIG. 9 shows an improved gas bearing pocket configuration comprising, in accordance with another preferred embodiment of the present invention, four bearing pockets 126 formed in a spherical gas bearing surface 122 of the gas version of the statically pressurized compact spindle bearing assembly, and FIG. 10 shows an improved gas bearing pocket configuration comprising, in accordance with still another preferred embodiment of the present invention, four bearing pockets 128 formed in a planar gas bearing surface 124 of the gas version of the statically pressurized compact spindle bearing assembly. Each land surface 22c of the spherical gas bearing surface 122 of FIG. 9 is bounded by an inside surface 130, two exhaust slots 132 and an outside surface 134. Similarly, each land surface 22d of the planer gas bearing surface 124 of FIG. 10 is bounded by an inside surface 136, two exhaust slots 138 and an outside surface 140. The bearing pockets used are simplified by eliminating one of the slots to form a modified bearing pocket having one short slot 142 and two long slots 144. Although the asymmetric geometry of these bearing pockets makes the use of four supplemental exhaust gas slots impractical, two supplemental exhaust gas slots 146 are used in the manner described hereinbefore.

All of the foregoing examples have assumed a bearing load varying incrementally, in a sinusoidal manner, about a nominal design value. Many gas bearings, on the other hand, are required to operate over a wide range of loads. One example is that of a gas bearing utilized to support a corner of a load table of a coordinate measuring machine upon which various unknown test objects are mounted. The problem to be resolved is that of designing the gas bearing for stability under a range of loads while maintaining the highest possible value for the spring constant k across the range of loads.

Figure 11A:
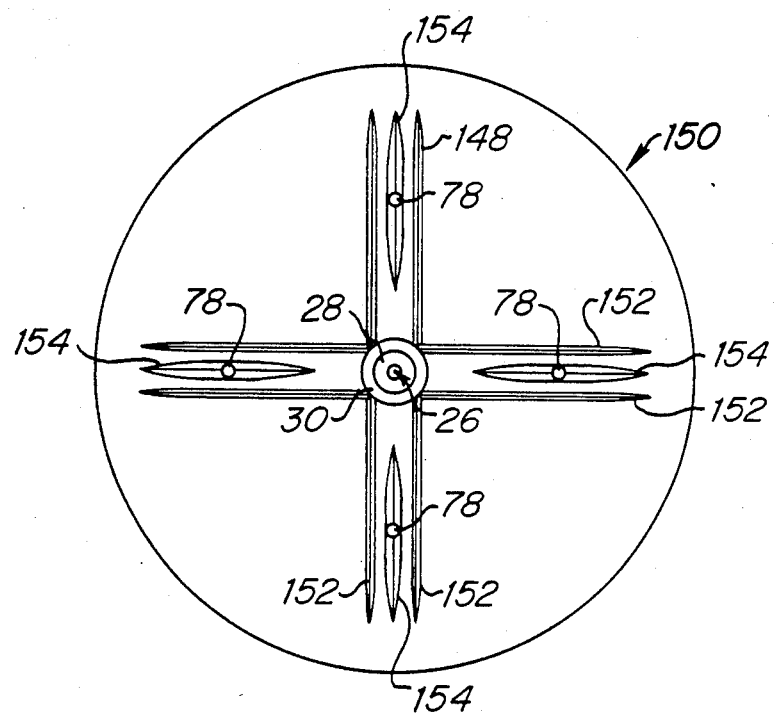
FIGS. 11A and 11B are a plan view and an enlarged sectional view, respectively, of a statically pressurized gas bearing, in accordance with another embodiment of the present invention, having a pocket configuration optimized for a range of bearing loads.
Figure 11B:
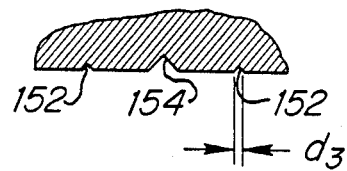

As noted above, stability is guaranteed if $a/(a-1) > 3jC_1(P_1-15)/mAg$. Since the load $F_1$ can be evaluated by $F_1 = (P_1-15)nA$, it can be seen that the highest value of $(P_1-15)$ occurs when $(P_1-15) = (P_{01}-15) = F_{01}/mA$, where $F_{01} = F_1(\max.)$. The stability criteria can therefore be restated as follows:

$$a_{01}/(a_{01}-1) > 3jC_{01}F_{01}/mnA^2 g_{01},$$

where the ratio $a_{01}$ and the flying height $g_{01}$ are maximum and minimum values, respectively, evaluated when $F_1 = F_{01}$. For all values of $F_1 < F_{01}$, the flying height $g > g_{01}$ and the ratio $a/(a-1)$ assumes a conservatively large value. Since the unperturbed value of the spring constant k is determined by $k = 3(a-1)jnA(P_1-15)/ag = 3(a-1)jF_1/ag$, a conservatively large value of $a/(a-1)$ results in an unnecessarily small value of the spring constant k for load values less than $F_{01}$. FIGS. 11A and 11B show a plan view and an enlarged sectional view, respectively, of a bearing pocket design that solves this problem. A modified double cross 148 is formed by slots 152, each having a selected dimension $d_3$ cross the opening thereof, in a gas bearing 150. The dimension $d_3$ of each slot 152 is chosen to be of such a value that each leg of the double cross 148 effectively becomes a capillary restrictor when the flying height g enlarges as $F_1$ decreases and the pneumatic resistance $R_2$ is reduced in value. The effect is two fold. An additional restrictor is placed in series with the pneumatic resistance $R_2$, thus reducing the pocket pressure $P_1$ with less associated reduction in $R_2$. Further, the pocket pressure $P_1$ is no longer constant along the length of each component slot 152 of the double cross 148. This is because the pocket pressure $P_1$ drops along the length of each component slot 152 in response to a parasitic gas loss to corresponding supplemental exhaust gas slots 154 (which are similar to the supplemental exhaust gas slots previously dicussed but are of a larger cross section than the slots 152). Thus, the values of the ratio m, ratio n and the flying height g are reduced as well. This results in an increased value for the spring constant k for such lighter loads. A range of values of $d_3$ chosen between $$N_2^{0.25} L^{0.25} g_{01}^{0.75} < d_3 < 4 N_2^{0.25} L^{0.25} g_{01}^{0.75},$$

where L is the distance along any slot 152 from any crossing slot 152 to a point opposite the middle of an adjacent supplemental exhaust slot 74, have proven to be effective.

The above method of optimizing bearing performance for gas bearings subjected to a range of loads has the added advantage that it results in selecting the minimum possible values of bearing pocket volume and therefore pneumatic capacitance $C_1$ as called for hereinbefore. Thus, both the stability criteria and spring constant are optimized for all load values. This optimization method is applicable, without exception, to all the bearing pocket configurations described hereinbefore.

I claim:

1. A statically pressurized gas bearing comprising:
    a first bearing part having a bearing surface;
    a second bearing part having a conforming bearing surface;
    a gas inlet and an input flow restrictor formed in the second bearing part;
    a cross bearing pocket comprising slots formed in the conforming bearing surface of the second bearing part and disposed in communication with the input flow restrictor;
    at least one portion of the cross bearing pocket having a double slot configuration; and
    at least one supplemental exhaust slot formed within a portion of the cross bearing pocket having the double slot configuration.

2. A statically pressurized gas bearing as in claim 1 wherein each slot of the cross bearing pocket has an opening dimension, $d_3$, chosen between $$N_2^{0.25} L^{0.25} g_{01}^{0.75} < d_3 < 4 N_2^{0.25} L^{0.25} g_{01}^{0.75},$$

where $N_2$ is a geometrically determined number of squares arranged orthogonally with respect to the direction of outgoing gas flow across a land surface portion of the conforming bearing surface of the second bearing part, L is the dimension from any crossing slot to the middle of a supplemental exhaust slot and $g_{01}$ is the flying height of the gas bearing when the gas bearing is loaded.

3. A statically pressurized gas bearing as in claim 1 wherein the cross bearing pocket comprises a double cross slot configuration bearing pocket.

4. A statically pressurized gas bearing comprising:
    a first bearing part having a bearing surface;
    a second bearing part having a conforming bearing surface;
    a gas inlet and an input flow restrictor formed in the second bearing part;

a gas bearing pocket, of one or more arms, comprising slots formed in the conforming bearing surface of the second bearing part and disposed in communication with the input flow restrictor;

at least one arm of the gas bearing pocket having a double slot configuration; and at least one supplemental exhaust slot formed within an arm having the double slot configuration.

5. A statically pressurized gas bearing as in claim 4 wherein each slot of the gas bearing pocket has an opening dimension, $d_3$, chosen between $$N_2^{0.25}L^{0.25}g_{01}^{0.75} < d_3 < 4N_2^{0.25}L^{0.25}g_{01}^{0.75},$$

where $N_2$ is a geometrically determined number of squares arranged orthogonally with respect to the direction of outgoing gas flow across a land surface portion of the conforming bearing surface of the second bearing part, L is the dimension from any crossing slot to the middle of a supplemental exhaust slot and $g_{01}$ is the flying height of the gas bearing when the gas bearing is loaded.

6. A statically pressurized gas bearing as in claim 4 wherein each arm of the gas bearing pocket has a double slot configuration and a supplemental exhaust slot.

7. A statically pressurized gas bearing configuration comprising:

a gas inlet;
an input flow restrictor;
a cross bearing pocket comprising slots formed in a bearing surface and disposed in communication with the input flow restrictor;
a least one portion of the cross bearing pocket having a double slot configuration; and
at least one supplemental exhaust slot formed within a portion of the cross bearing pocket having the double slot configuration.

8. A statically pressurized gas bearing configuration as in claim 7 wherein each slot of the cross bearing pocket has an opening dimension, $d_3$, chosen between $$N_2^{0.25}L^{0.25}g_{01}^{0.75} < d_3 < 4N_2^{0.25}L^{0.25}g_{01}^{0.75},$$

where $N_2$ is a geometrically determined number of squares arranged orthogonally with respect to the direction of outgoing gas flow across a land surface portion of the bearing surface, L is the dimension from any crossing slot to the middle of a supplemental exhaust slot and $g_{01}$ is the flying height of the gas bearing when the gas bearing is loaded.

9. A statically pressurized gas bearing configuration as in claim 7 wherein the cross bearing pocket comprises a double cross slot configuration.

10. A statically pressurized gas bearing configuration comprising:

a gas inlet;
an input flow restrictor;
a gas bearing pocket, of one or more arms, comprising slots formed in a bearing surface and disposed in communication with the input flow restrictor;
at least one arm of the gas bearing pocket having a double slot configuration; and
at least one supplemental exhaust slot formed within each arm having the double slot configuration.

11. A statically pressurized gas bearing configuration as in claim 10 wherein each slot of the gas bearing pocket has an opening dimension, $d_3$, chosen between $$N_2^{0.25}L^{0.25}g_{01}^{0.75} < d_3 < 4N_2^{0.25}L^{0.25}g_{01}^{0.75},$$

where $N_2$ is a geometrically determined number of squares arranged orthogonally with respect to the direction of outgoing gas flow across a land surface portion of the bearing surface, L is the dimension from any crossing slot to the middle of a supplemental exhaust slot and $g_{01}$ is the flying height of the gas bearing when the gas bearing is loaded.

12. A statically pressurized gas bearing configuration as in claim 10 wherein each arm of the gas bearing pocket has a double slot configuration and a supplemental exhaust slot.

13. A statically pressurized gas bearing comprising at least one input flow restrictor for supplying gas to an associated bearing pocket, said input flow restrictor comprising an inwardly offset annular land formed in the a gas bearing between an inlet hole portion of a gas inlet of the gas bearing and the bearing pocket, and said bearing pocket comprising at least one slot formed in the bearing surface, wherein said slot has an opening dimension, $d_3$, chosen between $$N_2^{0.25}L^{0.25}g_{01}^{0.75} < d_3 < 4N_2^{0.25}L^{0.25}g_{01}^{0.75},$$

where $N_2$ is a geometrically determined number of squares arranged orthogonally with respect to the direction of outgoing gas flow across a land surface portion of the bearing surface of the gas bearing, L is the dimension from the input flow restrictor to the middle of the longest portion of the bearing pocket slot, and $g_{01}$ is the flying height of the gas bearing when the gas bearing is loaded.

14. A statically pressurized gas bearing as in claim 13 wherein at least one of the bearing pocket slots comprises a double slot, and a supplemental exhaust slot is formed in the space between the slots forming the double slot.

* * * * *